Patented Sept. 12, 1950

2,521,902

UNITED STATES PATENT OFFICE 2,521,902

N-FLUOROALKYLACRYLAMIDES AND POLYMERS THEREOF

Harry W. Coover, Jr., and Joseph B. Dickey, Rochester, N. Y., assignors to Eastman Kodak Company, Rochester, N. Y., a corporation of New Jersey No Drawing. Application April 6, 1948, Serial No. 19,427

12 Claims. (Cl. 260—89.7)

This invention relates to new organic fluorine-containing acrylamides, a process for making them, and resins prepared therefrom.

According to our invention we prepare new organic compounds by reacting an acrylyl chloride or a beta-chloropropionyl chloride with a primary or secondary fluoroalkylamine in the presence of an organic tertiary amine. When we react a beta-chloropropionyl chloride with a primary or secondary fluoroalkylamine, two molecular equivalents of organic tertiary amine are used, since in addition to acting as a hydrohalogen acceptor for the hydrogen chloride liberated when the acid chloride reacts with the primary or secondary amine, the organic tertiary amine has to serve as a dehydrohalogenating agent for removal of hydrogen chloride from the acid portion of the beta-chloropropionamide formed to give an unsaturated amide or an acrylamide. Advantageously we can react acrylyl chloride or α-methylacrylyl chloride, i. e. a compound represented by the formula:

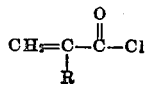

wherein R represents a member selected from the group consisting of a hydrogen atom and a methyl group, with one of our primary or secondary fluoroalkylamines.

The fluorinated-alkylamines which can be used in preparing the amides of our invention can be represented by the following two formulas:

and
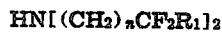

wherein $R_1$ represents a member selected from the group consisting of a hydrogen atom, a fluorine atom, and a methyl group, and $n$ represents a positive integer from 1 to 3. Typical amines include, for example, 2,2,2-trifluoroethylamine ($H_2NCH_2CF_3$), 2,2-difluoroethylamine ($H_2NCH_2CHF_2$), N,N-di(2,2,2-trifluoroethyl)amine [$HN(CH_2CF_3)_2$], N,N-di(2,2-difluoroethyl)amine [$HN(CH_2CHF_2)_2$], 3,3,3-trifluoropropylamine ($H_2NCH_2CH_2CF_3$), 4,4,4-trifluorobutylamine ($H_2NCH_2CH_2CH_2CF_3$), 2,2-difluoropropylamine ($H_2NCH_2CF_2CH_3$), 3,3-difluorobutylamine ($H_2NCH_2CH_2CF_2CH_3$), etc.

The organic tertiary amines which can be used in the process of our invention include: triethylamine, tri-n-propylamine, triisopropylamine, tri-n-butylamine, triisobutylamine, tri-secondary butylamine, dimethylaniline, diethylaniline, pyridine, quinoline, isoquinoline, etc.

The following examples will serve to illustrate the general method whereby we prepare our new fluorinated-acrylamides.

*Example I.—N-(2,2,2-trifluoroethyl)acrylamide*

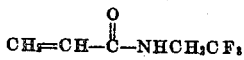

11.5 gms. of 2,2,2-trifluoroethylamine were added to 10.7 gms. of triethylamine dissolved in 25 cc. of methylene chloride. The resulting solution was then slowly added to a cold solution of 9.59 gms. of acrylyl chloride dissolved in 40 cc. of methylene chloride. During the addition the mixture was constantly stirred and the temperature kept below 5° C. by cooling. The reaction mixture was then allowed to come up to room temperature and stirred for one hour. The precipitated triethylamine hydrochloride was filtered off, and the filtrate fractionally distilled under a vacuum. There was thus obtained a good yield of N-(2,2,2-trifluoroethyl)acrylamide boiling at 73–74° C./2 mm.

By substituting a molecularly equivalent amount of 3,3,3-trifluoropropylamine in the above example, N-(3,3,3-trifluoroethyl-acrylamide represented by the formula:

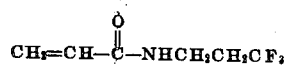

can be obtained in good yield.

*Example II.—N-(2,2,2-trifluoroethyl)-α-methylacrylamide*

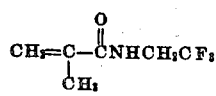

11.5 gms. of trifluoroethylamine were added to 10.7 gms. of triethylamine dissolved in 25 cc. of methylene chloride. The resulting solution was slowly added to a cold solution of 11.4 gms. of α-methylacrylyl chloride dissolved in 40 cc. of methylene chloride. During the addition the mixture was constantly stirred and the temperature kept below 5° C. by cooling. The reaction mixture was then allowed to come up to room temperature and stirred for one hour. The precipitate of triethylamine hydrochloride was filtered off, and the filtrate fractionally distilled under a vacuum. There was thus obtained a good yield of N-(2,2,2-trifluoroethyl)-α-methylacrylamide.

When a molecularly equivalent amount of 2,2-difluoropropylamine is substituted in the above example, N-(2,2-difluoropropyl)-α-methylacrylamide having the formula:

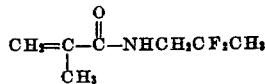

can be obtained.

*Example III.—N-(2,2-difluoroethyl)-α-methylacrylamide*

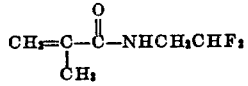

8.59 gms. of 2,2-difluoroethylamine were added to a solution of 10.7 gms. of triethylamine in 25 cc. of methylene chloride. The resulting solution was then slowly added with stirring to a cold solution of 11.4 gms. of α-methylacryl chloride in 40 cc. of methylene chloride. During the addition the temperature was kept below 5° C. by cooling. The reaction mixture was allowed to rise to room temperature after the addition was complete, and the precipitate of diethylamine hydrochloride which formed was separated by filtration. The filtrate was fractionally distilled under a vacuum and a good yield of N-(2,2-difluoroethyl)-α-methylacrylamide was obtained.

If a molecularly equivalent amount of 4,4,4-trifluorobutylamine is substituted in the above example, N-(4,4,4-trifluoroethyl)-α-methylacrylamide having the formula:

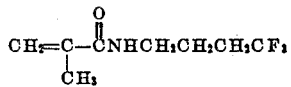

can be obtained.

*Example IV.—N-(2,2-difluoroethyl)acrylamide*

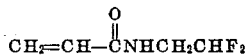

8.6 gms. of 2,2-difluoroethylamine were added to a solution of 10.7 gms. of triethylamine in 25 cc. of methylene chloride. The resulting solution was then slowly added to a stirred, cold solution of 9.0 gms. of acrylyl chloride in 40 cc. of methylene chloride. During the addition the temperature was kept below 5° C. by cooling. After the addition was complete the reaction mixture was allowed to come to room temperature and stirred for an hour. The precipitated diethylamine hydrochloride was filtered off, and the filtrate fractionally distilled under a vacuum. There was thus obtained a good yield of N-(2,2-difluoroethyl-acrylamide boiling at 86 to 90° C./3 mm.

When a molecularly equivalent amount of 3,3-difluorobutylamine is substituted in the above example, a good yield of N-(3,3-difluorobutyl)-acrylamide having the formula:

can be obtained.

*Example V.—N,N-di-(2,2-difluoroethyl)acrylamide*

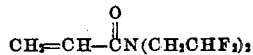

14.6 gms. of di-(2,2-difluoroethyl)amine were added to a solution of 10.7 gms. of triethylamine in 25 cc. of methylene chloride. The resulting solution was then slowly added with stirring to a cold solution of 11.4 gms. of α-methylacrylyl chloride in 40 cc. of methylene chloride. During the addition the temperature was kept below 5° C. by cooling, and after the addition had been completed the reaction mixture was allowed to rise to room temperature. The mixture was stirred for an additional period of 1 hour, and the precipitated diethylamine hydrochloride filtered off. The filtrate was fractionally distilled under a vacuum, and a good yield of N,N-(2,2-difluoroethyl)acrylamide was obtained.

If a molecularly equivalent amount of di-(2,2,2-trifluoroethyl)amine is substituted in the above example, a good yield of N,N-di-(2,2,2-trifluoroethyl)acrylamide having the formula:

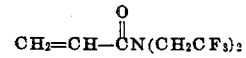

can be obtained.

*Example VI.—N,N-di-(2,2,2-trifluoroethyl)-α-methylacrylamide*

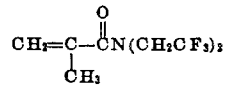

18.1 gms. of di-(2,2,2-trifluoroethyl)amine were added to a solution of 10.7 gms. of diethylamine in 25 cc. of methylene chloride. The resulting solution was slowly added with stirring to a cold solution of 11.4 gms. of α-methylacrylyl chloride in 40 cc. of methylene chloride. During the addition the temperature was kept below 5° C. by cooling, and after the addition was complete the reaction mixture was allowed to come to room temperature. The mixture was stirred for an additional period of one hour, and the precipitated triethylamine hydrochloride was filtered off. The filtrate was then fractionally distilled under a vacuum and an excellent yield of N,N-di-(2,2,2-trifluoroethyl)-α-methylacrylamide was obtained.

If a molecularly equivalent amount of di-(2,2-difluoroethyl)amine is substituted in the above example, N,N-di-(2,2-difluoroethyl)-α-methylacrylamide having the formula:

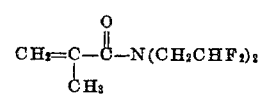

can be obtained.

By substituting other fluorinated alkyl amines in the above examples, fluorinated alkyl acrylamides coming within the formulas:

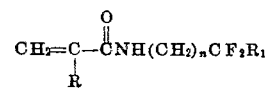

and

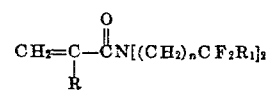

wherein R, $R_1$ and $n$ have the definitions set forth above, can be advantageously prepared.

Our new fluorinated-alkyl acrylamides can conveniently be either homopolymerized or interpolymerized with another copolymerizable, unsaturated compound by any of the known methods employed by the art. For example, polymers can be prepared by heating these fluorinated-alkyl acrylamides, in the presence or absence of another copolymerizable, unsaturated compound, in the presence of substances which are known to catalyze the polymerization of vinyl-type compounds. Such catalysts include the organic peroxides, such as benzoyl peroxide, acetyl peroxide, acetyl benzoyl peroxide, lauroyl peroxide, etc.; the persulfates, such as the alkali persulfates (sodium, potassium, and ammonium persulfates); hydrogen peroxide, etc. Actinic or ultra-violet light can be used alone or to supplement the above catalysts. Certain so-called "initiating" agents, such as sodium bisulfite, etc., can also be used in conjunction with the usual polymerization catalysts.

The polymerization can also be carried out by the bead or emulsion method, in which water or some other medium in which the monomers are insoluble is used with or without the aid of dispersing agents, the polymer thus precipitating as a fine powder as it is formed. Our polymerization can also be carried out in the presence of an organic solvent for the monomers, but in which the polymers are substantially insoluble. Solvents can be used, however, which dissolve the polymer where this is desired, the polymer being obtained by pouring the polymer solution into a solvent, such as methanol or ethanol, in which the polymer is not soluble.

The amount of polymerization catalyst used can be varied and is usually a function of the unsaturated compounds being polymerized. Generally from 0.01% to 2% by weight, based on the total weight of the compounds to be polymerized, is adequate. Larger amounts can be used, if desired, although there is ordinarily no advantage in doing so.

The following examples will illustrate the manner whereby our fluorinated-alkyl acrylamides are homopolymerized or interpolymerized with another copolymerizable, unsaturated compound.

*Example VII.—Homopolymer of N-(2,2,2-trifluoroethyl)acrylamide*

0.02 gm. of benzoyl peroxide was added to 10.0 gms. of N-(2,2,2-trifluoroethyl)acrylamide obtained according to the process described in Example I above. The mixture was then heated on a water bath, maintained at about 65° C., for 48 hours. The mixture gradually thickened toward the end of the heating period, and by the time the heating was completed, it had set to a clear, hard resin which could be molded in any desired shape.

*Example VIII.—Copolymer of acrylonitrile and N-(2,2,2-trifluoroethyl)acrylamide*

18.0 gms. of acrylonitrile, 2.0 gms. of N-(2,2,2-trifluoroethyl)acrylamide obtained according to the process of Example I above, 2.0 cc. of a 10% solution of hydrogen peroxide, 1.0 cc. of 6 N sulfuric acid, and 0.4 gm. of $FeSO_4 \cdot 7H_2O$ were added with stirring to 200 cc. of freshly distilled water. The polymerization started immediately and was completed in 3 to 4 hours. A 95% yield of a white, powdery polymer was obtained. When this polymer was dissolved in a suitable solvent and the solution extruded into a coagulating bath according to the method described in the copending application S. N. 19,426 of J. B. Dickey, H. W. Coover and T. E. Stanin, filed on even date herewith (now U. S. Patent 2,487,859, dated November 15, 1949), filaments having a high lustre and excellent tenacity are obtained.

*Example IX.—Homopolymer of N-(2,2-difluoroethyl)acrylamide*

0.02 gm. of benzoyl peroxide was added to 10.0 gms. of N-(2,2-difluoroethyl)acrylamide obtained according to the process described in Example IV above. The mixture was then heated on a water bath, maintained at about 65° C., for 48 hours. The mixture gradually thickened as the heating continued until at the end of the 48-hour period it had set to a clear, hard resin. This resin was found to be suitable for molding, or a solution of the resin could be shaped into thin, transparent sheet when extruded onto a metallic surface.

*Example X.—Copolymer of acrylonitrile and N-(2,2-difluoroethyl)acrylamide*

A mixture of 5.0 gms. of acrylonitrile, 5.0 gms. of N-(2,2-difluoroethyl)acrylamide obtained according to the process of Example IV above and 0.02 gm. of benzoyl peroxide was heated on a water bath, maintained at about 65° C., for 48 hours. The mixture gradually thickened in consistency during the period of heating, until it had set to a hard, white polymer at the end of the 48-hour period. This resin was found to be useful for making film, fibers, etc.

*Example XI.—Copolymer of acrylonitrile and N-(2,2-difluoroethyl)acrylamide*

18.0 gms. of acrylonitrile, 2.0 gms. of N-(2,2-difluoroethyl)acrylamide prepared according to the process described in Example IV above, 1.7 gms. of ammonium persulfate and 3.4 gms. of sodium bisulfite were added to 180 cc. of freshly distilled water with stirring. The polymerization began to take place immediately at room temperature, and after 3 to 4 hours was complete. The copolymer precipitated as it was formed, and after polymerization was complete, it was filtered off from the reaction mixture. After drying in a hot-air oven at 50 to 60° C., an 85% yield of a white, powdery resin was obtained.

*Example XII.—Copolymer of acrylonitrile and N,N-di-(2,2,2-trifluoroethyl)acrylamide*

5 gms. of acrylonitrile were added to a mixture of 5.0 gms. of N,N-di-(2,2,2-trifluoroethyl)acrylamide, prepared in accordance with the process described in Example V above, and 0.02 gm. of benzoyl peroxide. The resulting mixture was placed on a water bath and heated for 48 hours at about 65° C. The reaction mixture gradually thickened during the heating until it had set to a white, hard polymer at the end of the 48 hours. This polymer was found to be suitable for molding.

If a molecularly equivalent amount of N,N-di-(2,2,-difluoroethyl)acrylamide is substituted for the N,N-di-(2,2,2-trifluoroethyl)acrylamide in the above example, a good yield of a white, hard, moldable copolymer can be obtained.

*Example XIII.—Copolymer of methyl α-methacrylate and N-(2,2,2-trifluoroethyl)acrylamide*

10 gms. of methyl α-methylacrylate were added to a mixture of 2.0 gms. of N-(2,2,2-trifluoroethyl)acrylamide prepared in accordance with the process of Example I above and 0.04 gm. of acetyl peroxide The mixture was placed in a sealed glass tube and heated at about 65° C. for 24 hours. At the end of this time the mixture had set to a clear, hard resin which was found to be suitable for molding. By varying the ratio of methyl α-methylacrylate to N-(2,2,2-trifluoroethyl)acrylamide and the time of reaction, polymers exhibiting varying degrees of softness can be obtained.

When a molecularly equivalent amount of N,N-di-(2,2,2-trifluoroethyl) - α - methylacrylamide is substituted for the N-(2,2,2-trifluoroethyl)acrylamide in the above example, a hard, white polymer suitable for molding is obtained.

Operating in a similar manner other copolymerizable vinyl-type compounds can be interpolymerized with our new fluorinated-alkyl acrylamides. Typical vinyl-type compounds include vinyl acetate, vinyl chloride, acrylic acid, α-methylacrylic acid, methyl acrylate, methyl α-methylacrylate, ethyl acrylate, ethyl α-methylacrylate, propyl acrylate, propyl α-methylacrylate, styrene, ethylene, propylene, isobutylene, acrylonitrile, etc., and mixtures of these compounds. These polymers or copolymers of our new fluorinated-alkyl acrylamides are useful for molding, forming into films, etc., and solutions of these polymers, especially those with acrylonitrile, are useful for spinning into fibers.

Many of the fluorinated-alkylamines from which we prepare our acrylamides are known and described in the art, and the class as a whole is old. Benning and Park U. S. Patents 2,348,321, dated May 9, 1944, for example, describes amines of the formula $CF_3(CH)_nNH_2$ where $n$ is a digit from 1 to 5. Other compounds of this class are described in the copending application of J. B. Dickey S. N. 624,942, filed October 26, 1945, now U S. Patent 2,516,106, dated July 25, 1950. Adams et al. in "Organic Reactions," vol. II, page 75 (John Wiley & Son publishers) disclose di-(2,2-difluoroethyl)amine, prepared by the reaction of 2,2-difluoroethyl bromide with ammonia. The primary amines which were used in the process of our invention were prepared according to the process of Benning and Park, while the secondary amines were prepared according to the process described by Adams et al. in Organic Reactions. In preparing 3,3-difluorobutylamine, for example, approximately 2 molecular equivalents of ammonia (as ammonium hydroxide) are reacted with 1 molecular equivalent of 3,3-difluorobutyl chloride, and the desired primary amine is separated by fractional distillation under a vacuum. A small amount of a secondary amine having the formula:

$$HN(CH_2CH_2CF_2CH_3)_2$$

is also formed, but is removed in the fractional distillation as a high boiling fraction. Other primary amines can be prepared by substituting molecularly equivalent amounts of other fluorinated alkyl chlorides or bromides in the process of Benning and Park.

Following the method refered to by Adams et al. in "Organic Reactions," other secondary amines can be prepared. For example, 2,2,2-trifluoroethyl bromide (2 mols) was reacted with ammonia (1 mol) in an alcoholic solution, and the mixture of primary and secondary amines treated with aqueous hydrochloric acid. The low boiling alcohol was fractionated off, and the free amines liberated by the addition of sodium hydroxide. The mixture was then extracted with ether several times, and the extracts combined. The ethereal solution was fractionally distilled and the ether removed as a forerun. There was thus obtained a fraction of di-(2,2,2-trifluoroethyl)amine boiling at 93° C. Similarly by substituting other known fluorinated alkyl chlorides or bromides in the process described above, other secondary amines useful in practicing the process of our invention can be prepared.

While our new fluorinated-alkylacrylamides can be interpolymerized with another copolymerizable unsaturated compound in substantially any desired ratio, we have found that it is advantageous to polymerize a mixture consisting of from 5 to 75% by weight of our new fluorinated-alkylacrylamides and from 25 to 95% by weight of the other polymerizable compound. A smaller range which we can conveniently use is from 10 to 50% by weight of the fluorinated-alkyl-acrylamides and from 50 to 90% by weight of the other polymerizable compound. Larger or smaller quantities of our new fluorinated-alkyl-acrylamides can be used in the monomeric mixture prior to polymeripation, if desired, since they polymerize with extreme readiness.

What we claim and desire secured by Letters Patent of the United States is:

1. A compound selected from the group consisting of those represented by the following two formulas:

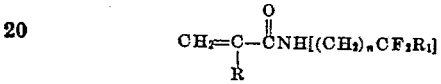

and

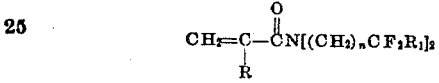

wherein R represents a member selected from the group consisting of a hydrogen atom and a methyl group, $R_1$ represents a member selected from the group consisting of a hydrogen atom, a fluorine atom, and a methyl group, and $n$ represents a positive integer from 1 to 3.

2. A compound having the formula:

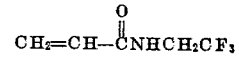

3. A compound having the formula:

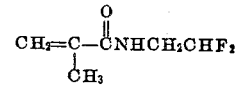

4. A compound having the formula:

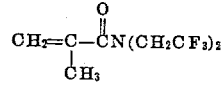

5. A process for preparing a fluoroalkylacrylamide which comprises reacting an acid chloride having the formula:

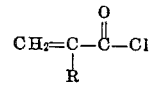

wherein R represents a member selected from the group consisting of a hydrogen atom and a methyl group, with an amine selected from the group consisting of those represented by the following two formulas:

$$H_2N(CH_2)_nCF_2R_1$$

and $$HN[(CH_2)_nCF_2R_1]_2$$

wherein $R_1$ represents a member selected from the group consisting of a hydrogen atom, a fluorine atom, and a methyl group and $n$ represents a positive integer from 1 to 3, in the presence of an organic tertiary amine 6. A process for preparing an amide represented by the formula:

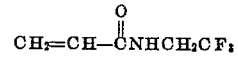

which comprises reacting acrylyl chloride with 2,2,2-trifluoroethylamine in the presence of an organic tertiary amine.

7. A process for preparing an amide represented by the formula:

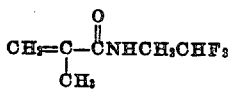

which comprises reacting α-methylacrylyl chloride with 2,2-difluoroethylamine in the presence of an organic tertiary amine.

8. A process for preparing an amide represented by the formula:

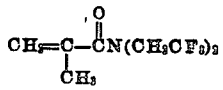

which comprises reacting α-methylacrylyl chloride with N,N-di-(2,2,2-trifluoroethyl) amine in the presence of an organic tertiary amine.

9. A polymer of a compound selected from the group consisting of those represented by the following two formulas:

and

wherein R represents a member selected from the group consisting of a hydrogen atom and a methyl group, $R_1$ represents a member selected from the group consisting of a hydrogen atom, a fluorine atom, and a methyl group, and $n$ represents a positive integer from 1 to 3.

10. A polymer of a compound having the formula:

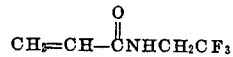

11. A polymer of a compound having the formula:

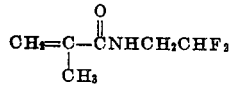

12. A polymer of a compound having the formula:

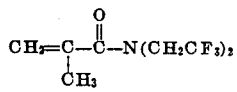

HARRY W. COOVER, JR.
JOSEPH B. DICKEY.

REFERENCES CITED

The following references are of record in the file of this patent:

UNITED STATES PATENTS

| Number | Name | Date |
| --- | --- | --- |
| 2,311,548 | Jacobson et al. | Feb. 16, 1943 |
| 2,387,501 | Dietrich | Oct. 23, 1945 |